United States Patent
Chono et al.

(10) Patent No.: US 12,056,955 B2
(45) Date of Patent: Aug. 6, 2024

(54) INFORMATION PROVIDING DEVICE, INFORMATION PROVIDING METHOD, AND STORAGE MEDIUM

(71) Applicant: NEC Corporation, Tokyo (JP)

(72) Inventors: Keiichi Chono, Tokyo (JP); Masato Tsukada, Tokyo (JP); Chisato Funayama, Tokyo (JP); Ryuichi Akashi, Tokyo (JP); Yuka Ogino, Tokyo (JP); Takashi Shibata, Tokyo (JP); Shoji Yachida, Tokyo (JP); Hiroshi Imai, Tokyo (JP); Emi Kitagawa, Tokyo (JP); Yasuhiko Yoshida, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/223,462

(22) Filed: Jul. 18, 2023

(65) Prior Publication Data

US 2023/0360439 A1 Nov. 9, 2023

Related U.S. Application Data

(63) Continuation of application No. 17/278,381, filed as application No. PCT/JP2019/036497 on Sep. 18, 2019, now Pat. No. 11,816,927.

(30) Foreign Application Priority Data

Sep. 26, 2018 (JP) .................. 2018-181027

(51) Int. Cl.
*G06V 40/19* (2022.01)
*G06V 40/18* (2022.01)
*G06V 40/50* (2022.01)

(52) U.S. Cl.
CPC .............. *G06V 40/19* (2022.01); *G06V 40/18* (2022.01); *G06V 40/50* (2022.01)

(58) Field of Classification Search
None
See application file for complete search history.

(56) References Cited

U.S. PATENT DOCUMENTS

2003/0020828 A1 1/2003 Ooi et al.
2005/0270386 A1 12/2005 Saitoh et al.
(Continued)

FOREIGN PATENT DOCUMENTS

CN 101295357 A 10/2008
CN 201207196 Y 3/2009
(Continued)

OTHER PUBLICATIONS

US Office Action for U.S. Appl. No. 17/683,608, mailed on Sep. 7, 2023.
(Continued)

*Primary Examiner* — Mohammed Rachedine
(74) *Attorney, Agent, or Firm* — Sughrue Mion, PLLC

(57) ABSTRACT

An information providing device according to one aspect of the present disclosure includes: at least one memory storing a set of instructions; and at least one processor configured to execute the set of instructions to: receive a face image; determine whether a person in the face image is unsuitable for iris data acquisition based on the face image; and output information based on determining that the person is unsuitable for the iris data acquisition when the person is determined to be unsuitable for the iris data acquisition.

9 Claims, 4 Drawing Sheets

(56) References Cited

U.S. PATENT DOCUMENTS

| | | | |
|---|---|---|---|
| 2006/0085650 A1 | 4/2006 | Nakamura | |
| 2008/0292144 A1 | 11/2008 | Kim | |
| 2013/0162799 A1 | 6/2013 | Hanna | A61B 5/117 348/78 |
| 2015/0049179 A1* | 2/2015 | Son | H04N 23/64 348/78 |
| 2016/0012218 A1* | 1/2016 | Perna | G07C 9/37 726/18 |
| 2016/0117544 A1* | 4/2016 | Hoyos | H04N 5/33 348/78 |
| 2016/0125221 A1* | 5/2016 | Kim | G06T 7/0012 382/117 |
| 2016/0171323 A1 | 6/2016 | Gadde et al. | |
| 2017/0032137 A1 | 2/2017 | Landqvist | G06F 21/36 |
| 2017/0255814 A1 | 9/2017 | Kaehler | |
| 2018/0018516 A1 | 1/2018 | Odinokikh | G06V 40/193 |
| 2018/0032815 A1* | 2/2018 | Lee | G06V 40/193 |
| 2018/0075295 A1 | 3/2018 | Yamaguchi | G06F 3/011 |
| 2018/0096119 A1 | 4/2018 | Yun et al. | |
| 2018/0137335 A1 | 5/2018 | Kim et al. | |
| 2018/0218212 A1 | 8/2018 | Yoshikawa et al. | |
| 2018/0285544 A1 | 10/2018 | Chang et al. | |
| 2018/0348861 A1 | 12/2018 | Uscinski et al. | |

FOREIGN PATENT DOCUMENTS

| | | | | |
|---|---|---|---|---|
| CN | 103106401 B | * | 2/2017 | |
| CN | 206195921 U | | 5/2017 | |
| CN | 108154126 A | * | 6/2018 | G06V 40/18 |
| CN | 108470170 A | | 8/2018 | |
| CN | 108629293 A | * | 10/2018 | G06K 9/00604 |
| CN | 108960153 A | * | 12/2018 | |
| JP | H11-015972 A | | 1/1999 | |
| JP | 3315648 B2 | | 8/2002 | |
| JP | 2002-312772 A | | 10/2002 | |
| JP | 2003-138817 A | | 5/2003 | |
| JP | 2004-086614 A | | 3/2004 | |
| JP | 2005-334402 A | | 12/2005 | |
| JP | 2006-113772 A | | 4/2006 | |
| JP | 2006212185 A | | 8/2006 | |
| JP | 2007-257040 A | | 10/2007 | |
| JP | 2018-124733 A | | 8/2018 | |
| WO | 2013/154273 A1 | | 10/2013 | |
| WO | WO-2016049273 A1 | * | 3/2016 | A61B 3/1216 |
| WO | 2016/076912 A1 | | 5/2016 | |
| WO | 2017/136857 A1 | | 8/2017 | |
| WO | WO-2018151349 A1 | | 8/2018 | |

OTHER PUBLICATIONS

International Search Report for PCT Application No. PCT/JP2019/036497, mailed on Oct. 29, 2019.
English translation of Written opinion for PCT Application No. PCT/JP2019/036497, mailed on Oct. 29, 2019.
Extended European Search Report for EP Application No. 19867478.0 dated on Oct. 21, 2021.
Japanese Office Action for JP Application No. 2020-548539 mailed on May 10, 2022 with English Translation.
Singapore Office Communication for SG Application No. 11202103106Y mailed on Aug. 25, 2022.
US Office Action for U.S. Appl. No. 17/683,620, mailed on Feb. 16, 2023.
US Office Action for U.S. Appl. No. 17/683,608, mailed on Mar. 2, 2023.
JP Office Action for JP Application No. 2022-175963, mailed on Aug. 22, 2023 with English Translation.
US Office Action for U.S. Appl. No. 18/227,851, mailed on Mar. 28, 2024.
US Office Action for U.S. Appl. No. 17/683,592, mailed on May 20, 2024.

* cited by examiner

INFORMATION PROVIDING DEVICE, INFORMATION PROVIDING METHOD, AND STORAGE MEDIUM

The present application is a Continuation application of Ser. No. 17/278,381 filed on Mar. 22, 2021, which is a National Stage Entry of PCT/JP2019/036497 filed on Sep. 18, 2019, which claims priority from Japanese Patent Application 2018-181027 filed on Sep. 26, 2018, the contents of all of which are incorporated herein by reference, in their entirety.

TECHNICAL FIELD

The disclosure relates to a technique for performing authentication using an iris.

BACKGROUND ART

One type of biological authentication (biometrics authentication) is authentication using an iris.

PTL 1 discloses a biometrics authentication device that executes processing including a step for determining a quality of read iris data and a step for executing collation processing using data with high quality. In the step for determining the quality, a control unit detects that a part of the iris data is missing due to an obstacle or the like, the eyes are not sufficiently opened, and the iris is defocused and cannot be confirmed due to a movement of a user when the iris is read, or the like. In a case were the number of times when data with poor quality is acquired or the number of times when collation fails exceeds the predetermined number of times, a failure of the authentication is notified to the user. Then, when the user presses a button, a cause of the failure of the authentication is displayed by a display unit. The technique in PTL 1 attempts to improve a success rate of the authentication of the user through such processing.

CITATION LIST

Patent Literature

[PTL 1] JP 2007-257040 A

SUMMARY

Technical Problem

Because the biometrics authentication device described in PTL 1 assumes that the cause of the failure of the authentication be a cause that can be resolved, the cause is notified to the user.

However, there is a cause that has a low possibility to be resolved from among the causes that data with high quality cannot be acquired. For example, in a case where the user is a person who is not able to or has difficulty in acquiring data with an appropriate quality, even if the cause is notified to the user, the cause is unlikely to be resolved, and there is a possibility that a success rate of the authentication of the user is not improved.

For such a user, even if the device repeatedly attempts to acquire the iris data, the iris data suitable for authentication cannot be acquired. Therefore, the attempt to acquire the iris data goes in vain. A processing time of the device that attempts to acquire the iris data is wasted, and in addition, there is a disadvantage that the user wastes labor and time.

One object of the example embodiments is to provide a device, a method, or the like that reduces a wasteful behavior, wasteful processing, or the like that may occur in a scene in which iris data is acquired.

Solution to Problem

An information providing device according to one aspect of the example embodiments includes: reception means for receiving a face image, determination means for determining whether a person in the face image is unsuitable for iris data acquisition on the basis of the face image; and output means for outputting information based on determining that the person is unsuitable for the iris data acquisition when the person is determined to be unsuitable for the iris data acquisition.

An information providing method according to one aspect of the example embodiments includes receiving a face image, determining whether a person in the face image is unsuitable for iris data acquisition on the basis of the face image, and outputting information based on determining that the person is unsuitable for the iris data acquisition in a case where it is determined that the person is unsuitable for the iris data acquisition.

A storage medium according to one aspect of the example embodiments stores a program causing a computer to execute: reception processing of receiving a face image; determination processing of determining whether a person in the face image is unsuitable for iris data acquisition on the basis of the face image; and output processing of outputting information based on determining that the person is unsuitable for the iris data acquisition in a case where it is determined that the person is unsuitable for the iris data acquisition. One aspect of the example embodiments is also achieved by the program.

Advantageous Effects

According to the example embodiments, it is possible to reduce a wasteful behavior, wasteful processing, or the like that may occur in a scene in which iris data is acquired.

EXAMPLE EMBODIMENT

Hereinafter, example embodiments will be described in detail with reference to the drawings.

First Example Embodiment

First, a first example embodiment will be described.

Figure 1:
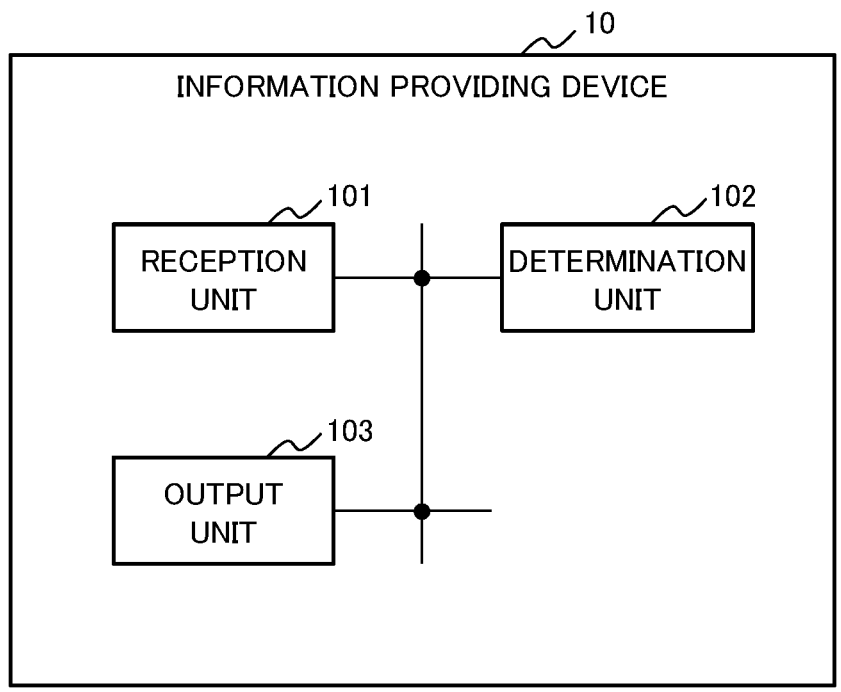
FIG. 1 is a block diagram illustrating a configuration of an information providing device according to a first example embodiment.

FIG. 1 is a block diagram illustrating a configuration of an information providing device 10 according to the first example embodiment.

The information providing device 10 includes a reception unit 101, a determination unit 102, and an output unit 103.

The reception unit 101 receives a face image as an input. The face image is an image of a part of or an entire face of a person including at least an eye region.

The determination unit 102 determines whether the person in the face image is unsuitable for iris data acquisition on the basis of the face image received by the reception unit 101. The iris data indicates data of an iris.

In a case where it is determined that the person in the face image is unsuitable for the acquiring the iris data, the output unit 103 outputs information based on the determination that the person in the face image is unsuitable for the iris data acquisition.

Figure 2:
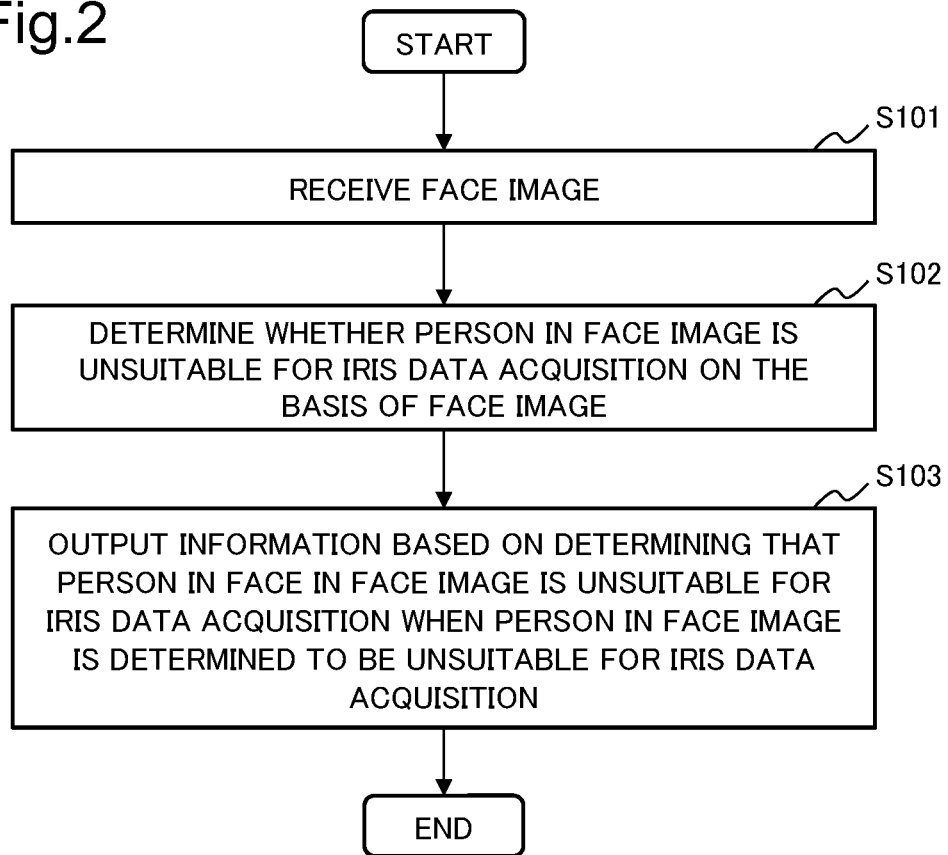
FIG. 2 is a flowchart illustrating a flow of an information providing method according to the first example embodiment.

A flow of an operation of the information providing device 10 will be described with reference to the flowchart in FIG. 2. First, the reception unit 101 receives a face image (step S101).

Next, the determination unit 102 determines whether a person in the face image is unsuitable for iris data acquisition on the basis of the face image received by the reception unit 101 (step S102).

Then, in a case where it is determined that the person in the face image is unsuitable for the iris data acquisition, the output unit 103 outputs information based on the determination that the person in the face image is unsuitable for the iris data acquisition (step S103). In a case where it is not determined that the person in the face image is unsuitable for the iris data acquisition, the output unit 103 does not output the image output in a case where it is determined that the person in the face image is unsuitable for the iris data acquisition. Alternatively, the output unit 103 may output information different from the information output in a case where it is determined that the person in the face image is unsuitable for the iris data acquisition.

According to the information providing device 10, it is possible to reduce a wasteful behavior, wasteful processing, or the like that may occur in a scene in which iris data is acquired. This is because, in a case where the person who is unsuitable for the iris data acquisition is in the face image, the determination unit 102 determines that the person is a person who is unsuitable for the iris data acquisition. Then, this is because the output unit 103 outputs the information based on that the person is a person who is unsuitable for the iris data acquisition. According to the information output from the output unit 103, the device or the person for receiving the information performs processing, a behavior, or determination based on that a person who is unsuitable for the iris data acquisition attempts to make the device acquire the iris data in such a way that it is possible to stop or prevent the attempt of the person to make the device acquire the iris data.

Second Example Embodiment

Hereinafter, a specific example of the first example embodiment will be described.

Figure 3:
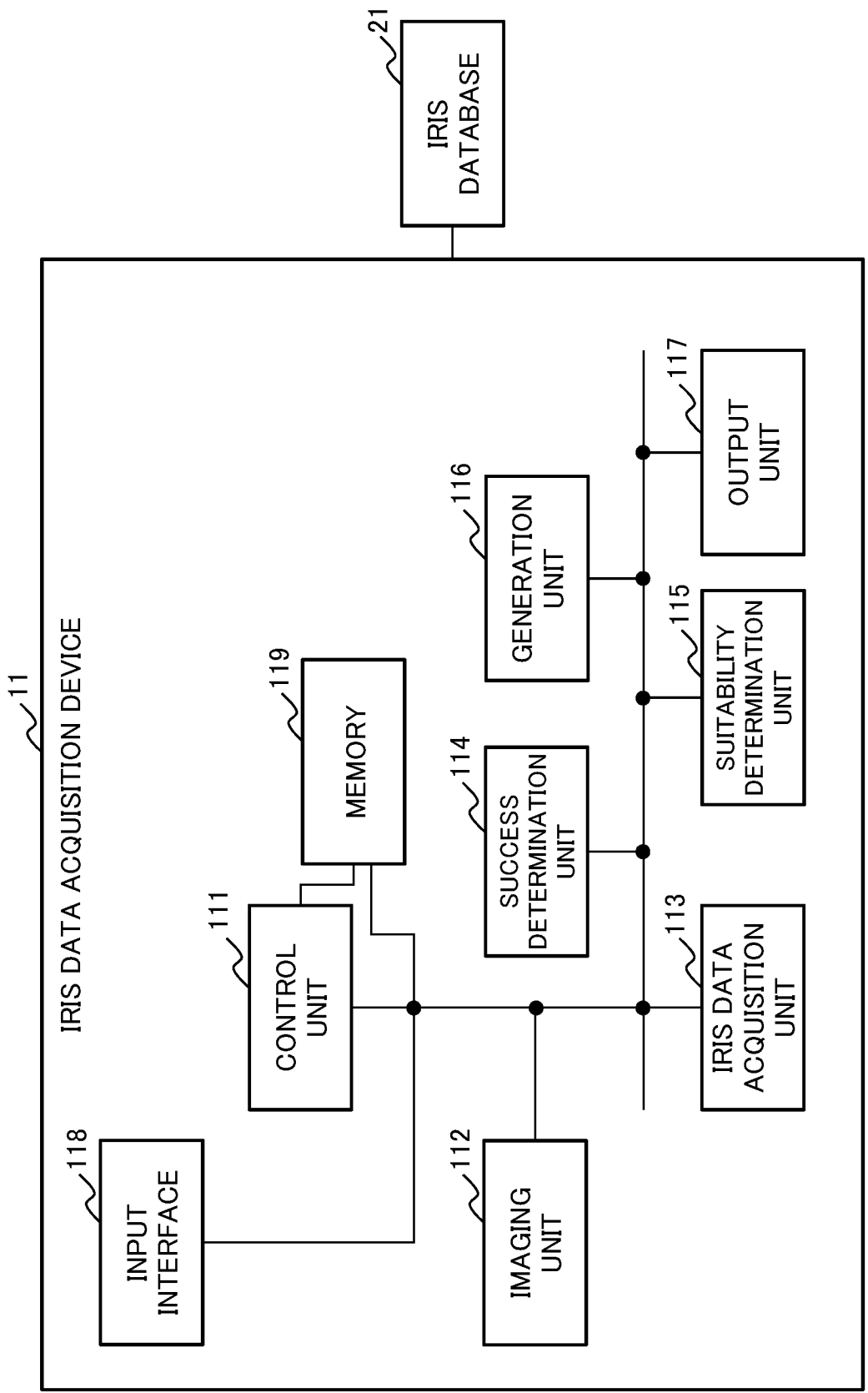
FIG. 3 is a block diagram illustrating a configuration of an iris data acquisition device according to a second example embodiment.

One of specific examples of the information providing device 10 is an iris data acquisition device 11 illustrated in FIG. 3. The iris data acquisition device 11 is a device that acquires iris data. The iris data acquisition device 11 determines whether a person is unsuitable for the iris data acquisition in a process of processing of imaging and recording an iris from the person.

As illustrated in FIG. 3, the iris data acquisition device 11 is communicatively connected to an iris database 21. The iris database 21 is a database that stores the iris data.

The iris database 21 stores information used to identify an individual and data of an iris of the individual in a form in which the information and the iris data are associated with each other.

The information used to identify the individual may include, for example, a name, a date of birth, an attribute (gender, age, official position, or the like), a unique Identifier (ID) assigned to each person.

The iris data is, for example, an iris code (to be described later).

<Configuration>

Hereinafter, components of the iris data acquisition device 11 will be described.

As illustrated in FIG. 3, the iris data acquisition device 11 includes a control unit 111, an imaging unit 112, an iris data acquisition unit 113, a success determination unit 114, a suitability determination unit 115, a generation unit 116, an output unit 117, an input interface 118, and a memory 119.

===Input Interface 118===

The input interface 118 receives inputs of various commands from outside (for example, user of iris data acquisition device 11). The input interface 118 is, for example, a touch panel, a touch pad, a keyboard, and/or a port that receives a signal from an input device (mouse, keyboard, or the like), or the like.

===Memory 119===

The memory 119 temporarily or non-temporarily stores data handled by the iris data acquisition device 11. The memory 119 may be achieved, for example, by a Random Access Memory (RAM), a hard disk, a portable storage device, or the like. With respect to the memory 119, other components included in the iris data acquisition device 11 can freely read and write data.

===Control Unit 111===

The control unit 111 controls operations of the components included in the iris data acquisition device 11.

The control unit 111 controls a flow of the data handled by the iris data acquisition device 11. For example, the control unit 111 may receive an image generated by the imaging unit 112 and record the received image in the memory 119.

===Imaging Unit 112===

The imaging unit 112 generates an image including an iris by imaging the iris. The imaging unit 112 is, for example, a camera. The imaging unit 112 may be a visible light camera or an infrared camera. The imaging unit 112 performs imaging, for example, in response to an imaging instruction issued from the control unit 111. The imaging instruction is issued, for example, on the basis of a command that is input by a person to be imaged by the imaging unit 112 (that is, subject whose iris data is to be acquired) to the iris data acquisition device 11. In order to cause the iris data acquisition device 11 to acquire the data of the iris of the subject, the subject is positioned in front of the imaging unit 112 and inputs the command to the iris data acquisition device 11 via the input interface 118. Therefore, it is assumed that the subject be imaged in the image generated by the imaging unit 112. The subject may particularly adjust a direction of the imaging unit 112 or a position of the face of the subject in such a way that the iris of the subject is imaged.

===Iris Data Acquisition Unit 113===

The iris data acquisition unit 113 is configured to acquire the data of the iris of the subject included in the image from the image generated by the imaging unit 112. Specifically, the iris data acquisition unit 113 is configured to generate iris data that can be used for authentication from a pixel value in a region of the iris in the image.

Typical iris data that can be used for authentication is data referred to as an iris code. The iris code is data that is obtained by processing image data of the iris region. Because the iris code is biological information peculiar to an individual (so-called biometric information), the iris code is data that can be used for authentication in a case where the iris is appropriately imaged.

A method for generating the iris code by the iris data acquisition unit 113 includes, for example, the following steps.

Step for detecting an eye region from an image
Step for detecting an edge of an upper eyelid, an edge of a lower eyelid, a boundary between a pupil and an iris, and a boundary between an iris and a white eye (also referred to as sclera) in the eye region
Step for developing a pattern in a region in which the iris is imaged in a band-like shape
Step for encoding the developed pattern The iris data acquisition unit 113 may be configured to generate the iris code by executing the above steps.

===Success Determination Unit 114===

The success determination unit 114 determines whether the iris data has been successfully acquired by the iris data acquisition unit 113. Whether the iris data is successfully acquired is, in other words, whether the iris data that can be used for authentication can be acquired.

In a case where the iris data that can be used for authentication can be acquired by the iris data acquisition unit 113, the success determination unit 114 determines that the iris data has been successfully acquired. In a case where it is not possible for the iris data acquisition unit 113 to acquire the iris data that can be used for authentication, the success determination unit 114 determines that the iris data has not been successfully acquired (that is, has failed).

A case where it is not possible to acquire the iris data that can be used for authentication is, for example, a case where it is not possible to acquire the iris data itself because it is not possible to specify the position of the iris, an area of the iris displayed in the image is too small, or the like. In a case where an error occurs in any one of the processing in the steps executed by the iris data acquisition unit 113 described above and the acquisition of the iris data is not normally completed, the success determination unit 114 may determine that the iris data has not been successfully acquired by the iris data acquisition unit 113.

In addition, a case where it is not possible to acquire the iris data that can be used for authentication is a case where it is determined that the acquired iris data is unusable for authentication.

In a case where the acquisition of the iris data by the iris data acquisition unit 113 has been normally completed, the success determination unit 114 determines whether the acquired iris data can be used for authentication.

The iris data can be used for authentication, that is, specifically, quality of the iris data satisfies a predetermined standard for authentication using the iris data. The quality is evaluation on information represented by the iris data. The predetermined standard is a standard at which the authentication using the iris data can be performed with required accuracy. The predetermined standard is a design matter. However, as an example, the predetermined standard is that "authentication such that a false acceptance rate is equal to or less than 0.001% can be performed using the iris data".

For example, in a case where a feature specific for an individual does not sufficiently appear in the acquired iris data, it cannot be said that the iris data can be used for authentication. In a case where the acquired iris data has an unnatural feature as the feature of the iris, it cannot be said that the iris data can be used for authentication. Therefore, the success determination unit 114 may analyze the feature that appears in the acquired iris data, and determine whether the iris data can be used for authentication on the basis of the analysis.

In a case where the acquisition of the iris data is normally completed and the acquired iris data can be used for authentication, the success determination unit 114 determines that the iris data is successfully acquired. In a case where the iris data acquisition unit 113 cannot normally complete the acquisition of the iris data or in a case where the acquired iris data cannot be used for authentication, the success determination unit 114 determines that the iris data is not successfully acquired.

===Suitability Determination Unit 115===

The suitability determination unit 115 determines whether the subject is suitable for the iris data acquisition.

A person who is unsuitable for the iris data acquisition is a person who is not expected to acquire the iris data that can be used for authentication, from one point of view. The person who is unsuitable for the iris data acquisition is a person that has a cause that interferes the acquisition of the iris data, from one point of view.

Specific examples of the cause that interfere the acquisition of the iris data will be given.

The eye is an artificial eye
A colored contact lens is worn that obscures a part of or an entire iris in such a way that the feature of the iris cannot be sufficiently extracted
Most part of the iris is obscured by the eyelid due to symptoms of eyelid droop
Most part of the iris is obscured because an eyelid opening degree is extremely small (that is, slit eye)
The degree to which the iris is obscured by the eyelashes is unacceptable
It is not possible to obtain iris data with sufficient clarity due to movements such as tremors It is sufficient that the suitability determination unit 115 be configured to detect that the subject has any one of the above-mentioned causes from the face image. However, when the suitability determination unit 115 is configured, the cause detected by the suitability determination unit 115 may be some of the plurality of causes described above. The specific example described above is an example, and the suitability determination unit 115 may be configured to detect a cause other than the above that interferes the acquisition of the iris data.

Hereinafter, to determine whether the subject is unsuitable for the iris data acquisition is also referred to as "to determine a suitability of the subject". In the following, to determine that the subject is unsuitable for the iris data acquisition is also simply referred to as "to determine that the subject is unsuitable".

The suitability determination unit 115 may determine that the subject is unsuitable, for example, by detecting that the detected eye has a feature of an artificial eye.

The feature of the artificial eye may be, for example, a feature indicating that the eye is not a living body. The feature indicating that the eye is not a living body may be that the size of the pupil does not change. In this case, the imaging unit 112 may image a moving image including the eye region of the subject in an imaging range. Then, the suitability determination unit 115 may detect a variation in the size of the pupil. For example, a light source such as a Light Emitting Diode (LED) may be attached to the imaging unit 112. For example, the light source may be configured to emit light under control of the control unit 111. While the imaging unit 112 images a moving image, the control unit 111 may control the light source in such a way that the light source emits visible light to the face of the subject, for example, for a predetermined time period. The suitability determination unit 115 may detect the variation in the size of the pupil in the obtained moving image. The suitability determination unit 115 may determine a possibility that the eyes of the subject are artificial eyes on the basis of the magnitude of the detected variation, a distribution of the variation in the size of the pupil detected in the eye that is not an artificial eye and a distribution of the variation in the size of the pupil detected in the artificial eye. These distributions may be generated through experiments in advance. In a case where the possibility that the eyes of the subject are artificial eyes is lower than a predetermined standard, the suitability determination unit 115 may determine that the eye is not a living body, that is, the eye has the feature of the artificial eye.

The feature of the artificial eye may be that a pupil is not detected in a region of an iris. The suitability determination unit 115 may detect a region of the iris and a region of the pupil, for example, by any one of existing methods. Then, in a case where the region of the pupil is not detected in the region of the iris, the suitability determination unit 115 may determine that the imaged eye is an artificial eye. For example, in a case where a human eye is irradiated with near infrared light, reflection light of the near infrared light reflected by the retina is strengthened in a direction toward a light source of the near infrared light. In a case where the face of the subject is irradiated with near infrared light from the direction of the imaging unit 112, a portion of the pupil is brighter than a portion of the iris in an image obtained by imaging the face of the subject by the imaging unit 112. The pupil in such a state is referred to as a bright pupil. A method for detecting a pupil using this feature is referred to as a bright pupil method. In a case where the face of the subject is irradiated with infrared light from a direction different from an optical axis of the imaging unit 112, the portion of the pupil is darker than the portion of the iris in the image obtained by imaging the face of the subject by the imaging unit 112. The pupil in such as state is referred to as a dark pupil. A method for detecting a pupil using this feature is referred to as a dark pupil method. The suitability determination unit 115 may detect a pupil with a combination or either one of the bright pupil method and the dark pupil method. Then, in a case where the pupil is not detected, the suitability determination unit 115 may determine that the eyes of the subject are artificial eyes. In this case, a light source of near infrared light that is connected to the iris data acquisition device 11 may be provided at a position suitable for the method for detecting the pupil. In this case, the light source may be configured to emit infrared light, for example, for a predetermined time period while the imaging unit 112 performs imaging, for example, under the control of the control unit 111. The suitability determination unit 115 may detect the pupil using the obtained image. The suitability determination unit 115 may determine the possibility that the eyes of the subject are artificial eyes, for example, on the basis of a difference in the brightness of the pupil between a state where the near infrared light is not irradiated and a state where the near infrared light is irradiated. The suitability determination unit 115 may determine the possibility that the eyes of the subject are artificial eyes on the basis of a difference between brightness of the bright pupil and brightness of the dark pupil. In these cases, a distribution of the difference in the brightness of the eyes that are not artificial eyes and a distribution of the difference in the brightness of the eyes that are artificial eyes may be obtained, for example, through experiments in advance. In a case where the possibility that the eyes of the subject are artificial eyes is lower than a predetermined standard, the suitability determination unit 115 may determine that the eye is not a living body, that is, the eye has the feature of the artificial eye. The method for determining the feature of the artificial eye is not limited to the above method.

For example, the suitability determination unit 115 may determine that the subject is unsuitable by detecting presence of the colored contact lens and detecting that a range of the colored contact lens narrows a range of the iris.

The suitability determination unit 115 may determine the presence of the colored contact lens in the region of the iris and the range of the colored contact lens, for example, by template matching. In this case, the suitability determination unit 115 may hold images of iris portions of various colored contact lenses as templates. In this template matching, the suitability determination unit 115 may translate, enlarge, reduce, and rotate the template. In a case where the region of the iris matches the template, the suitability determination unit 115 may determine whether the colored contact lens exists on the basis of a value indicating a magnitude of a difference from the template at the matching place.

In a case where the portion of the iris of the colored contact lens is drawn by repeating patterns and in a case where the pattern of the portion of the iris is represented by halftone dots, the pattern of the portion of the iris has periodicity. The suitability determination unit 115 may detect the region of the iris and determine whether pixel values in the detected region of the iris have the periodicity. The suitability determination unit 115 may determine whether the periodicity exists in the circumferential direction and the radial direction in the region of the iris. In this case, the suitability determination unit 115 may convert the image of the region of the iris into a rectangular image, for example, in such a way that the radial direction is set as, for example, the vertical axis, and the circumferential direction is set as, for example, the horizontal axis. The suitability determination unit 115 may determine whether the converted rectangular image periodically changes in the vertical direction and the horizontal direction, for example, using conversion such as Fourier transformation on the converted image. The suitability determination unit 115 may set two axes orthogonal to each other to the image in which the face of the subject is imaged. The suitability determination unit 115 may cut out an image, in the rectangle surrounding the region of the iris, that has sides parallel to the set two axes from the image. The suitability determination unit 115 may determine whether the periodicity exists in the axial direction of the cut image. In a case where it is determined that there is periodicity, the suitability determination unit 115 may determine that the colored contact lens exists. The suitability determination unit 115 may determine whether the colored contact lens exists on the basis of a color of the pixel value in the region of the iris.

In a case where the pattern of the iris portion of the colored contact lens is drawn using coloring matters of the limited number (for example, equal to or less than three) of colors, it is considered that a sharp peak occurs in the distribution of the color of the iris portion of the colored contact lens. The suitability determination unit 115 may generate, for example, a distribution of the pixel value of the pixel included in the region of the iris. Then, the suitability determination unit 115 may detect the peaks of the pixel value of which a ratio of the number in the region of the iris is equal to or more than a predetermined ratio. The suitability determination unit 115 may determine sharpness of the detected peak. The sharpness of the peak may be represented, for example, by a half width. The suitability determination unit 115 may determine that the colored contact lens exists in a case where there is a peak sharper than a predetermined standard. The suitability determination unit 115 may further specify the distribution, in the region of the iris, of the pixel having the pixel value that appears in the distribution as the peak sharper than the predetermined standard. The suitability determination unit 115 may determine whether a level of a frequency of such a pixel in an outer peripheral portion of the iris region with respect to a frequency of such a pixel in an inner peripheral portion of the iris region exceeds a predetermined standard. The suitability determination unit 115 may determine that the colored contact lens exists in a case where the level of the frequency of such a pixel in the outer peripheral portion of the iris region with respect to the frequency of such a pixel in the inner peripheral portion of the iris region exceeds the predetermined standard. The method for determining whether the colored contact lens exists is not limited to the above method.

In a case where it is estimated that the iris data that can be used for authentication cannot be acquired even if the subject fully opens the eyes, the suitability determination unit 115 may determine that the subject is unsuitable.

For example, in a case where it is recognized that the received image is an image of a state where the subject fully opens the eyes in a case where the iris data is not successfully acquired, the suitability determination unit 115 may determine that the subject is unsuitable. To recognize whether the received image is the image of the state where the subject fully opens the eyes, for example, the iris data acquisition device 11 may inquire whether the subject is imaged in the state where the subject fully opens the eyes by the output unit 117 and receive an input of "Yes" or "No". In a case where "Yes" is input, because the iris data is not successfully acquired although the subject fully opens the eyes, the suitability determination unit 115 may determine that the subject is unsuitable.

To recognize whether the received image is the image of the state where the subject fully opens the eyes, the suitability determination unit 115 may detect features of the eyes or features around the eyes that occur in a case where the eyes are fully opened. For example, in a case where it is detected that the eyebrows are raised, the forehead is wrinkled, or the like, the suitability determination unit 115 may estimate that the subject fully opens the eyes.

The suitability determination unit 115 may estimate that the iris data that can be used for authentication cannot be acquired even if the subject fully opens the eyes on the basis of the positions and/or the shapes of the eyelids.

For example, the suitability determination unit 115 the suitability determination unit 115 may acquire a moving image of the eye of the subject and analyze the moving image. If the subject opens and closes the eyes in the moving image, a state where the eyelids are raised most is estimated as a state at the time when the subject fully opens the eyes at some extent. The suitability determination unit 115 may estimate the state where the subject fully opens the eyes from the state where the subject fully opens the eyes at some extent.

Alternatively, the suitability determination unit 115 may detect that the iris data that can be used for authentication cannot be acquired even if the subject fully opens the eyes by detecting a feature of a person who has characteristics such that most of the iris is constantly hidden by the eyelid (person having symptoms of eyelid droop and person having extremely narrow eyes) on the basis of the shapes of the eyelids in the received image. That is, the suitability determination unit 115 may detect, on the basis of the shapes of the eyelids, that the state of the eyelids that hides most of the irises is not temporary and is caused by the characteristics of the subject. For example, the suitability determination unit 115 may perform learning to prepare a discriminator that distinguishes between a shape of an eyelid when a person who can open the eyes so as not to hide the iris temporarily covers the iris with the eyelid and the shape of the eyelid when a person who has characteristics that most of the iris is obscured by the eyelid and may use the discriminator for the image of the eye of the subject.

The suitability determination unit 115 may determine that the subject is unsuitable by detecting an obstacle that obscures a part or all of the region of the iris, that the obstacle is the eyelash, and that a degree to which the eyelashes obscure the region of the iris is unacceptable. The suitability determination unit 115 may detect, for example, that the obstacle is the eyelash on the basis of the shape of the obstacle and the position of the obstacle in the face image. The suitability determination unit 115 may use an area of the eyelashes that covers over the iris portion as a measure of the degree to which the eyelashes obscure the iris region. In a case where the area exceeds a predetermined reference value, the suitability determination unit 115 may determine that the degree to which the eyelashes obscure the iris region is unacceptable.

The suitability determination unit 115 may determine a suitability of the subject by analyzing a state of the subject from a plurality of face images that is temporally continuous. For example, the suitability determination unit 115 may detect that the eyes of the subject are slightly shaking. The suitability determination unit 115 may detect that not only the eyes but also the entire face of the subject is slightly shaking or continuously moving. In a case where it is determined that the movement of the subject specified from the plurality of face images is at a level that interferes the acquisition of the iris data, the suitability determination unit 115 may determine that the subject is unsuitable.

The suitability determination unit 115 may be configured to execute a part or all of the plurality of determination methods described above.

It can be said that some of the above-described determination methods are methods for detecting that the subject has the feature (or nature) that interferes the acquisition of the iris data.

As the person who is determined by the suitability determination unit 115 to be unsuitable for the iris data acquisition, persons other than the person described above can be exemplified. The person other than the person described above who is determined to be unsuitable for the iris data acquisition will be described in "Note" field.

===Generation Unit 116===

The generation unit 116 generates information to be output by the output unit 117. The information to be generated is information indicating a result or progress of the processing by the iris data acquisition device 11. A specific example of the information to be generated will be described in the description of the operation of the iris data acquisition device 11.

===Output Unit 117===

The output unit 117 outputs the information generated by the generation unit 116.

An output destination of the output unit 117 is, for example, a display device that has an information display function or an information processing device or the like other than the iris data acquisition device 11.

<Operation>

Figure 4:
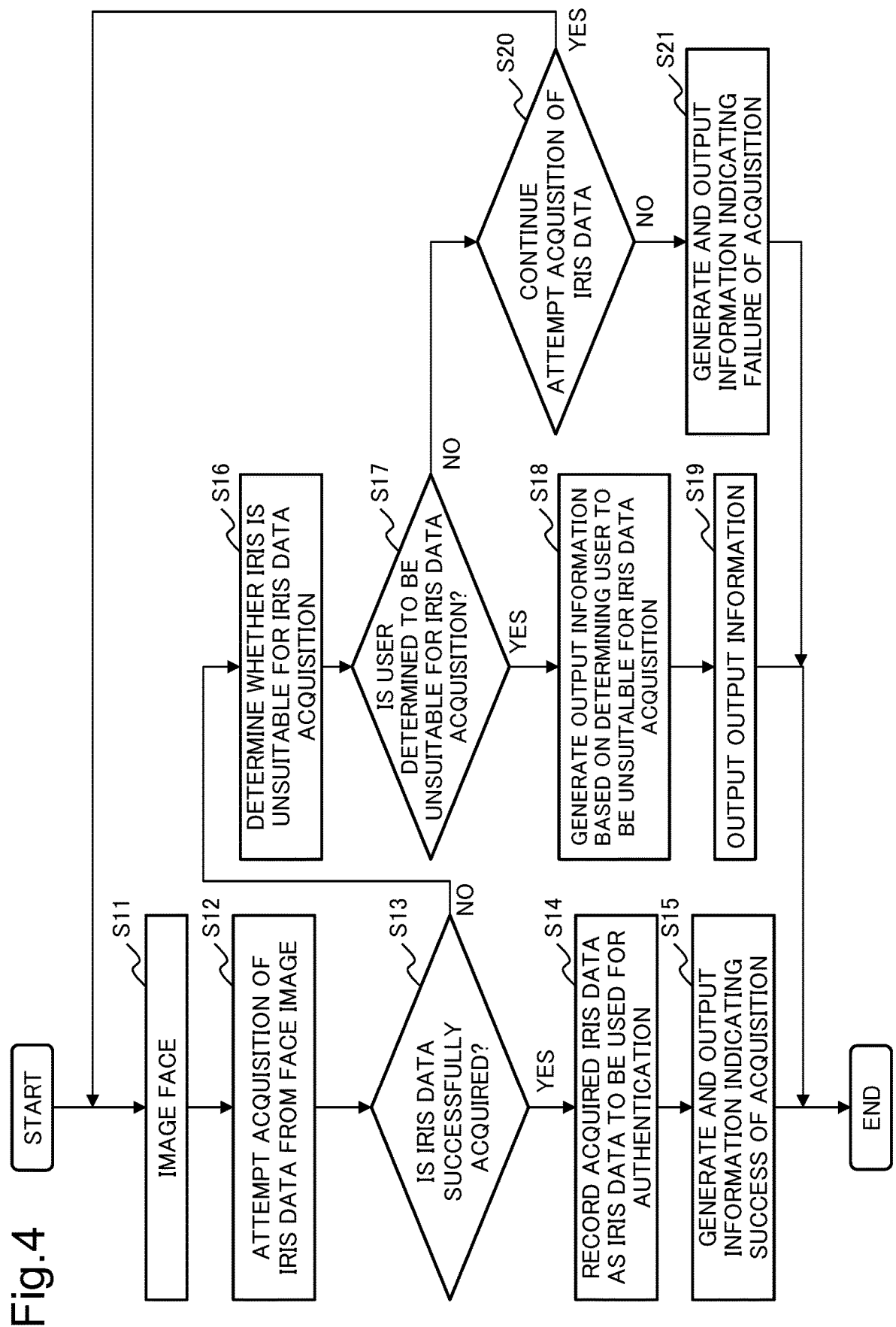
FIG. 4 is a flowchart illustrating a flow of processing by the iris data acquisition device according to the second example embodiment.

Hereinafter, a flow of the processing by the iris data acquisition device 11 will be described with reference to the flowchart in FIG. 4. In a case where each processing is executed by a processor that executes a program, it is sufficient that each processing be executed in an order of instructions in the program. In a case where each processing is executed by an individual device, it is sufficient that the processing be executed in order by issuing a notification by a device that has completed the processing to a device that executes next processing or by recognizing the end of each processing and instructing to start each processing by the control unit 111. It is sufficient that each unit that executes processing receive data necessary for each processing, for example, from a unit that generates the data and/or read the data from the memory 119.

The processing by the iris data acquisition device 11 described later may be started in a case where a person who intends to use the iris authentication uses the iris data acquisition device 11 to register iris data of the person in the iris database 21. The processing by the iris data acquisition device 11 may be started in a case where the person who intends to use the iris authentication uses the iris data acquisition device 11 to execute authentication processing of collating the iris data of the person with iris data registered in the iris database 21. Hereinafter, the person who intends to cause the iris data acquisition device 11 to acquire the iris data of the person is referred to as a "user".

First, the imaging unit 112 images a face of a user (step S11). For example, it is sufficient that the user stand in front of the imaging unit 112, input a command to perform imaging to the iris data acquisition device 11 via the input interface 118, and the control unit 111 send an imaging instruction to the imaging unit 112 in response to the command.

The imaging unit 112 performs imaging in such a way that a face image in which the face of the user is imaged is generated. However, the face image does not necessarily need to include the entire face. It is sufficient that the face image be an image in which a range where the iris exists is imaged.

When the face image is generated, the iris data acquisition unit 113 attempts to acquire iris data from the face image (step S12).

Next, the success determination unit 114 determines that the processing in step S12, that is, acquisition of the iris data is successfully performed (step S13).

In a case where it is determined that the iris data is successfully acquired (YES in step S13), the control unit 111 records the acquired iris data as iris data to be used for authentication (step S14). In a case where the iris data is acquired to register the iris data, it is sufficient that the control unit 111 register the acquired iris data in the iris database 21. In this case, the iris data acquisition device 11 may receive an input of personal identification information of the user via the input interface 118 (may have received in advance) and register a pair of the received personal identification information and the acquired iris data in the iris database 21. In a case where the iris data is acquired for collation with the iris data registered in the iris database 21, it is sufficient that the control unit 111 record the iris data in the memory 119 for collation. In this case, the iris data acquisition device 11 may collate the iris data recorded in the memory 119 with the iris data registered in the iris database 21.

After the processing in step S14, the generation unit 116 generates information indicating that the iris data is successfully acquired, and the output unit 117 outputs the information (step S15).

In a case where the iris data is acquired to register the iris data, the information indicating that the iris data is successfully acquired may be, for example, a message of "normally registered". In a case where the iris data is acquired for the collation with the iris data registered in the iris database 21, the information indicating that the iris data is successfully acquired may be information indicating whether the collation is successfully performed. In particular, in a case where the collation is successfully performed (that is, in a case where iris data that matches acquired iris data is found in iris database 21), the output unit 117 may output the personal identification information of the user specified by the collation as the information indicating that the iris data is successfully acquired. Information indicating that the collation fails (for example, message of "does not match data registered in database", or the like) may be one piece of the information indicating that the iris data is successfully acquired.

In a case where it is determined that the iris data is not successfully acquired (NO in step S13), the suitability determination unit 115 determines whether the user is suitable for the iris data acquisition (step S16).

In a case where it is determined that the user is unsuitable for the iris data acquisition (YES in step S17), the generation unit 116 generates output information on the basis of that the user is unsuitable for the iris data acquisition (step S18). Then, the output unit 117 outputs the output information (step S19). The output information is information output because the user is unsuitable for the iris data acquisition, and is different from the information output in step S15 and information to be output in step S21 described later.

The output information may be, for example, information including a message to the user.

Content of the message is, for example, a message indicating that an effort to cause the iris data acquisition device 11 to acquire the iris data should be stopped. Specific examples of the messages are "You are unsuitable for the iris data acquisition", "Unfortunately, it is difficult to acquire the iris data from you", "Please stop acquisition of the iris data", or the like.

The output information may be information including a message indicating that the user cannot perform a behavior to acquire the iris data anymore, for example, "The staff will be right with you. Please follow the staff's instructions", "It is difficult to acquire the iris data. The acquisition processing is terminated", or the like.

In a case where the output information is the information including the message to the user, it is sufficient that the output unit 117 output the output information to a display device that can be visually recognized by the user.

The output information may be, for example, information including a message that indicates that the person who is unsuitable for the iris data acquisition uses the iris data acquisition device 11 to a person other than the user. An example of the message is "Current user is unsuitable for the iris data acquisition. Please take care of the person" or the like.

In a case where the output information is the information including the message to the person other than the user, it is sufficient that the output unit 117 output (transmit) the output information to a terminal used by the person.

The output information does not need to include a message. For example, the output information may be a signal that lights a light emitter. If the light emitter is positioned at a position that can be visually recognized by a user or a staff, the user or the staff may understand that the user is unsuitable for the iris data acquisition on the basis of the lighting of the light emitter. In addition, the output information may be a signal that sounds a buzzer, an image from which occurrence of an error can be sensed, a signal that causes an information processing device connected to the iris data acquisition device 11 to execute specific processing, or the like.

In a case where the iris data acquisition device 11 starts or ends the specific processing on the basis of that the user is unsuitable for the iris data acquisition, information indicating that the iris data acquisition device 11 has started the specific processing and information indicating that the iris data acquisition device 11 ends the specific processing can be assumed as the output information.

In a case where the determination result in step S17 is YES, the acquisition of the iris data is not attempted again, and the control unit 111 terminates the processing.

In a case where it is not determined that the user is unsuitable for the iris data acquisition (NO in step S17), the control unit 111 may continue the attempt to acquire the iris data. In a case where the attempt to acquire the iris data is continued (YES in step S20), the procedure returns to step S11, and the iris data acquisition device 11 may attempt to acquire the iris data again.

In a case where the attempt to acquire the iris data is not continued (NO in step S20), the generation unit 116 generates information indicating that the acquisition of the iris data fails, and the output unit 117 outputs the information.

The information indicating that the acquisition of the iris data fails is, for example, information including a message of "Failed to acquire the iris data". The information indicating that the acquisition of the iris data fails is designed to be different from the output information output in step S19.

For example, in a case where a predetermined period of time has elapsed from the start of the processing in step S11, in a case where the number of times when it is determined as NO in step S13 reaches a predetermined number of times, or the like, the control unit 111 may determine not to continue the attempt to acquire the iris data.

Alternatively, the determination in step S20 may be made on the basis of determination by the user. The iris data acquisition device 11 may execute the processing in step S21 before the determination in step S20, display a message for inquiring "whether to attempt to acquire the iris data again" to the user, and receive a determination result of the user. In a case of receiving an input indicating that the user has determined to "attempt to acquire the iris data again", it is sufficient that the control unit 111 determine to continue the attempt to acquire the iris data.

The face may be automatically imaged after it is determined as YES in step S20 (without waiting for imaging instruction of user). The face may be imaged after it is determined as YES in step S20 in response to the reception of the imaging instruction from the user again.

The determination in step S16 may be made with different criteria for the same user between the first processing and the second and subsequent processing. That is, the criterion of the determination in step S16 may be designed to be different according to the number of times when step S12 or S16 is executed by the same user.

In a case where it is determined as YES in step S20, the output unit 117 may output a message to the user before the processing in step S11. It is sufficient that this message be generated by the generation unit 116. The message may have the same content as the message displayed in step S21. This message may be a message indicating advice to acquire more appropriate iris data such as "Please open your eyes" or "Your hair may cover your eyes. Please remove your hair". The generation unit 116 may generate such a message indicating the advice on the basis of a part of the result of the processing executed by the suitability determination unit 115.

[Note] More examples of the criteria of the determination in step S16 by the suitability determination unit 115

Some examples of the criteria of the determination in step S16 by the suitability determination unit 115 have been already described. However, more examples will be described below.

In a case where the number of times of reception of the imaging instruction from the same user in a state where the iris data is not successfully acquired exceeds a predetermined value, the suitability determination unit 115 may determine that the user is unsuitable for the iris data acquisition in step S16. Such a configuration detects that there is a high possibility that the iris data is not successfully acquired even if the user is repeatedly imaged, and contributes to stop further attempts to acquire the iris data by the user.

In a case where the number of times when the message indicating the advice is output to the same user in a state where the iris data is not successfully acquired exceeds a predetermined value, the suitability determination unit 115 may determine that the user is unsuitable for the iris data acquisition in step S16. Such a configuration detects that there is a high possibility that the user does not make improvement efforts or the improvement efforts of the user are not rewarded, and contributes to stop further attempts to acquire the iris data by the user.

The above-described predetermined value may be differently set according to a type, a degree, or the like of the failure of the acquisition of the iris data. For example, in a case where it is determined that the obstacle obscures a part of the iris in step S13, the predetermined value may be set to "4", and in a case where it is determined that the position of the iris cannot be specified in step S13, the predetermined value may be set to "2". For such determination, the success determination unit 114 may be configured to record the type and the degree of the failure in the memory 119 in step S13.

The degree of the failure is a measure of seriousness of the cause that has contributed the failure, and for example, is a degree of separation from an index for successful acquisition of iris data. For example, if the type of the failure is that an area of an iris that is visible in an image is small, the degree of the failure may be expressed by a value obtained by subtracting the area of the iris region that is visible in the image from a standard value (may be set on the basis of standard normal iris data). Another example of the information indicating the degree of the failure is, for example, a value indicating a possibility that eyes are artificial eyes, a value indicating an amount of an obstacle (eyelashes) that covers an iris, an evaluation value indicating a blurriness of an image, or the like.

The suitability determination unit 115 may calculate the degree of the failure, for the failure to be determined in step S13, on the basis of the data used in the determination in step S13. In a case where a score according to the degree of the failure determined in step S13 is cumulatively added and the accumulated value exceeds a predetermined value, the suitability determination unit 115 may determine that the user is unsuitable for the iris data acquisition. For example, in a case where the iris region is not sufficient in step S13, the success determination unit 114 makes the memory 119 store a value obtained by subtracting the area of the iris region that is visible in the image from the standard value as a score. Then, the success determination unit 114 accumulates the score each time when it is determined that the iris region is not sufficient in step S13. In a case where the suitability determination unit 115 determines whether the accumulated value exceeds the predetermined value in the determination in step S16 and the accumulated value exceeds the predetermined value, the suitability determination unit 115 may determine that the user is unsuitable for the iris data acquisition. The score is set to be higher as the degree of the failure increases in a form in which the accumulated value is compared with the predetermined value as described above. A uniform score may be set for a specific type of failure. A uniform score may be set for each type of failure.

The suitability determination unit 115 may make the determination in step S16 on the basis of the comparison between a degree of a recent failure and a degree of a previous failure. For example, in a case where the degree of the failure does not change even though the imaging is performed again, it can be said there is no possibility that the acquisition is successfully performed. Therefore, the success determination unit 114 may, for example, record the degree of the failure determined in step S13 in the memory 119. Then, for example, in a case where the degree of the recent failure is compared with the degree of the previous failure and a difference is less (smaller) than a reference in step S16, the suitability determination unit 115 may determine that the user is unsuitable for the iris data acquisition.

<Effect>

According to the iris data acquisition device 11 according to the second example embodiment, it is possible to reduce a wasteful behavior, wasteful processing, or the like that may occur in a scene in which the iris data is acquired. The reason is the same as the reason described in the description of the first example embodiment.

In the second example embodiment, it is determined whether the user is suitable for the iris data acquisition before the iris data acquired from the user is recorded. In a case where the iris data acquisition device 11 is used at the time when the iris data is registered in the iris database 21, the user can recognize that the user is unsuitable for the iris data acquisition before the iris data is registered in the iris database 21. As a result, it is possible to make the user who is unsuitable for the iris data acquisition to abandon the use of the iris authentication at an early stage. In a case where the iris data acquisition device 11 is used at the time of authentication, it is possible to urge the user to perform authentication using another authentication method other than the iris authentication at an early stage.

<Hardware Configuration that Implements Each Unit of Example Embodiment>

In each example embodiment described above, a block illustrating each component of each device is illustrated in functional units. However, the blocks illustrating the components do not necessarily mean that the components are configured by separate modules.

Processing of each component may be achieved, for example, by reading and executing a program that is stored in a computer-readable storage medium and causes a computer system to execute the processing by the computer system. The "computer-readable storage medium" is, for example, a portable medium such as an optical disk, a magnetic disk, a magneto-optical disk, or a nonvolatile semiconductor memory and a storage device such as a Read Only Memory (ROM), a hard disk, or the like built in a computer system. The "computer-readable storage medium" includes a storage medium that can temporarily hold a program such as a volatile memory in the computer system and a storage medium that transmits a program such as a communication line such as a network, a telephone line, or the like. The program may implement a part of the above-described functions or may implement the functions described above by a combination with a program that has been already stored in the computer system.

Figure 5:
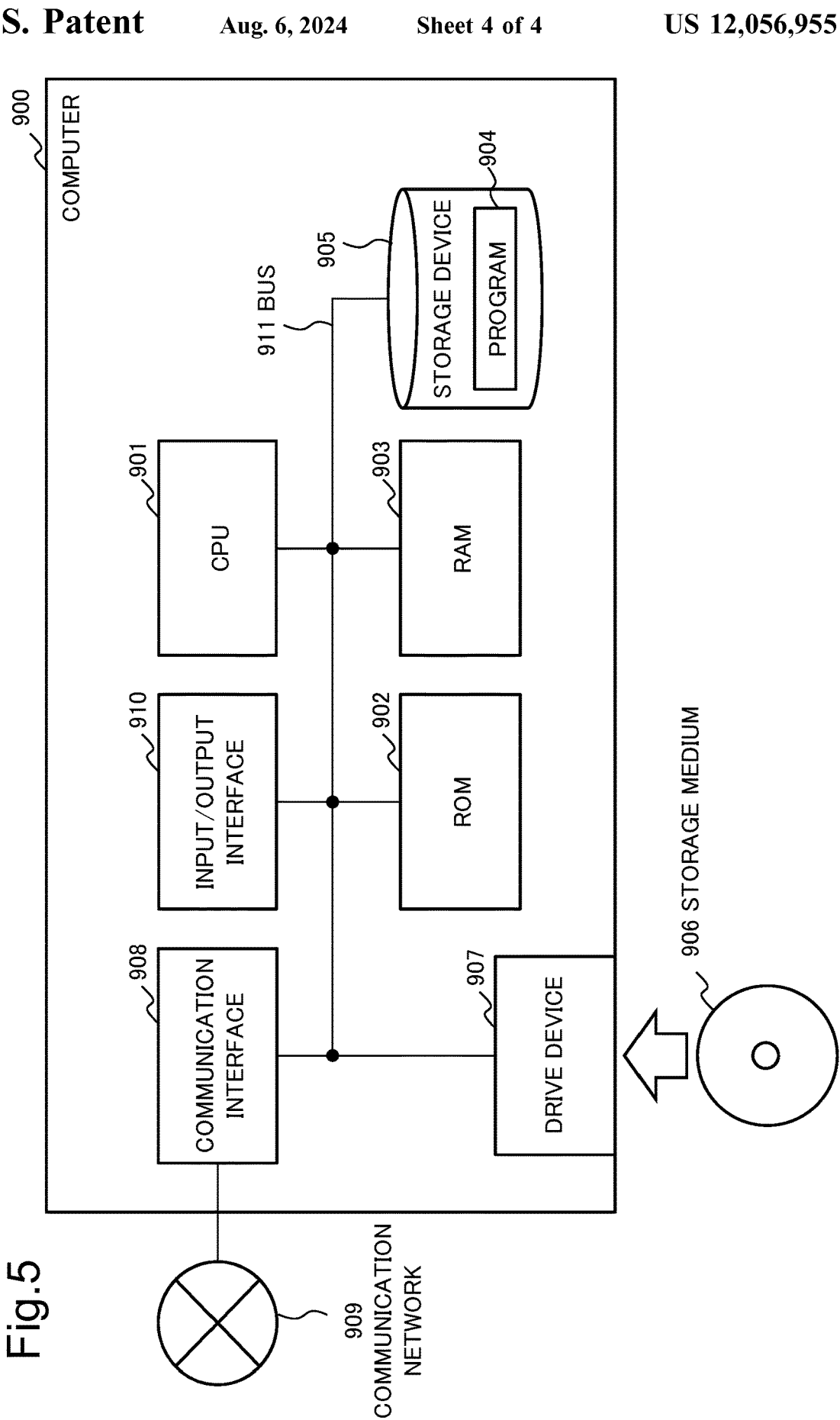
FIG. 5 is a block diagram illustrating an example of hardware included in each unit of each example embodiment.

The "computer system" is, for example, a system including a computer 900 as illustrated in FIG. 5. The computer 900 includes the following components.

One or a plurality of central Processing Units (CPU) 901
ROM 902
RAM 903
Program 904 loaded on RAM 903
Storage device 905 that stores program 904
Drive device 907 that reads/writes from/to storage medium 906
Communication interface 908 connected to communication network 909
Input/output interface 910 that inputs/outputs data
Bus 911 that connects components For example, each component of each device in each example embodiment is implemented by loading the program 904 for implementing the function of the component to the RAM 903 and executing the program 904 by the CPU 901. The program 904 for implementing the function of each component of each device is, for example, stored in the storage device 905 or the ROM 902 in advance. The CPU 901 reads the program 904 as necessary. The storage device 905 is, for example, a hard disk. The program 904 may be supplied to the CPU 901 via the communication network 909 or may be stored in the storage medium 906 in advance, read by the drive device 907, and supplied to the CPU 901. The storage medium 906 is a portable medium, for example, an optical disk, a magnetic disk, a magneto-optical disk, a nonvolatile semiconductor memory, or the like.

There are various modifications of the method for implementing each device. For example, each device may be implemented by a possible combination of a separate computer 900 and a program for each component. A plurality of components included in each device may be implemented by a possible combination of a single computer 900 and a program.

Some or all the components of each device may be implemented by another general-purpose or dedicated circuit, a computer, or a combination of these. These may be configured by a single chip or a plurality of chips connected via a bus.

In a case where some or all of the components of each device are implemented by a plurality of computers, circuits, or the like, the plurality of computers, circuits, or the like may be centrally arranged or dispersedly arranged. For example, the computers, the circuits, or the like may be implemented as a form, in which each of the computers, the circuits, or the like is connected via a communication network, such as a client and server system, a cloud computing system, or the like.

Although a part or all of the example embodiments may be described as supplementary notes below, a part or all of the example embodiments are not limited to the following supplementary notes.

<<Supplementary Note>>

[Supplementary Note 1]

An information providing device including:
reception means for receiving a face image;
determination means for determining whether a person in the face image is unsuitable for iris data acquisition based on the face image; and
output means for outputting information based on that it is determined that the person is unsuitable for the iris data acquisition in a case where it is determined that the person is unsuitable for the iris data acquisition.

[Supplementary Note 2]

The information providing device according to supplementary note 1, in which
the output means outputs at least one of information indicating that the person is unsuitable for the iris data acquisition and information that urges the person to stop a behavior to acquire the iris data of the person, as the information.

[Supplementary Note 3]

The information providing device according to supplementary note 1 or 2, in which
the determination means detects, from the face image, that the person has a cause that interferes the acquisition of the iris data and determines that the person is unsuitable for the iris data acquisition in a case where it is detected that the person has the cause that interferes the acquisition of the iris data.

[Supplementary Note 4]

The information providing device according to supplementary note 3, in which
the determination means determines that the person is unsuitable for the iris data acquisition by detecting that the person has the cause regarding opening of eyelids based on shapes of the eyelids of the person.

[Supplementary Note 5]

The information providing device according to any one of supplementary notes 1 to 4, further including:
iris data acquisition means for attempting to acquire the iris data from the face image; and
success determination means for determining whether the iris data acquisition means has acquired the iris data and whether quality of the iris data acquired by the iris data acquisition means is sufficient to be used for authentication, in which
the determination means determines whether the person is unsuitable for the iris data acquisition in a case where it is not possible for the iris data acquisition means to acquire the iris data or in a case where the success determination means determines that the quality of the acquired iris data is not sufficient to be used for authentication.

[Supplementary Note 6]

The information providing device according to supplementary note 5, in which
the output means outputs a message to the person in a case where it is not determined that the person is unsuitable for the iris data acquisition,
in a case where a new face image is input after the output of the message, the iris data acquisition means attempts to acquire iris data from the new face image, and the success determination means makes the determination, and
the determination means determines that the person is unsuitable for the iris data acquisition in a case where the number of times when the message is output to the person exceeds a threshold in a case where the iris data having quality sufficient to be used for authentication has never been acquired from the person.

[Supplementary Note 7]

The information providing device according to supplementary note 5, in which
in a case where the iris data having the quality sufficient to be used for authentication is not acquired, the success determination means calculates a seriousness of a cause of that the iris data having the quality sufficient to be used for authentication is not acquired based on information used for the determination and records seriousness information indicating the seriousness in a memory, and
the determination means determines whether the person is unsuitable for the iris data acquisition based on a history of the seriousness information.

[Supplementary Note 8]

The information providing device according to any one of supplementary notes 1 to 7, further including:
imaging means for generating a face image by imaging; and
registration means, in a case where the iris data of which quality satisfies a predetermined reference for authentication processing using the iris data is acquired, for registering, in a database, a pair of the acquired iris data and identification information of the person.

[Supplementary Note 9]

An information providing method including:
receiving a face image;
determining whether a person in the face image is unsuitable for iris data acquisition based on the face image; and
outputting information based on that it is determined that the person is unsuitable for the iris data acquisition in a case where it is determined that the person is unsuitable for the iris data acquisition.

[Supplementary Note 10]

The information providing method according to supplementary note 9, in which
at least one of information indicating that the person is unsuitable for the iris data acquisition and information that urges the person to stop a behavior to acquire the iris data of the person is output as the information.

[Supplementary Note 11]

The information providing method according to supplementary note 9 or 10, in which
it is detected, from the face image, that the person has a cause that interferes the acquisition of the iris data and it is determined that the person is unsuitable for the iris data acquisition in a case where it is detected that the person has the cause that interferes the acquisition of the iris data.

[Supplementary Note 12]

The information providing method according to supplementary note 11, in which
it is determined that the person is unsuitable for the iris data acquisition by detecting that the person has the cause regarding opening of eyelids based on shapes of the eyelids of the person.

[Supplementary Note 13]

The information providing method according to any one of supplementary notes 9 to 12, further including:
attempting to acquire the iris data from the face image;
determining whether the iris data is acquired by the acquisition and whether quality of the iris data acquired by the acquisition is sufficient to be used for authentication; and
determining whether the person is unsuitable for the iris data acquisition in a case where it is not possible to acquire the iris data or in a case where it is determined that the quality of the acquired iris data is not sufficient to be used for authentication.

[Supplementary Note 14]

The information providing method according to supplementary note 13, in which
in a case where it is not determined that the person is unsuitable for the iris data acquisition, a message to the person is output,
in a case where a new face image is input after the output of the message, acquisition of the iris data from the new face image is attempted, and the determination is made, and
it is determined that the person is unsuitable for the iris data acquisition in a case where the number of times when the message is output to the person exceeds a threshold in a case where the iris data having quality sufficient to be used for authentication has never been acquired from the person.

[Supplementary Note 15]

The information providing method according to supplementary note 13, in which
in a case where the iris data having the quality sufficient to be used for authentication is not acquired, a seriousness of a cause of that the iris data having the quality sufficient to be used for authentication is not acquired is calculated based on information used for the determination, and seriousness information indicating the seriousness is recorded in a memory, and
it is determined whether the person is unsuitable for the iris data acquisition based on a history of the seriousness information.

[Supplementary Note 16]

The information providing method according to any one of supplementary notes 9 to 15, further including:
in a case where the iris data of which quality satisfies a predetermined reference for authentication processing using the iris data is acquired, registering, in a database, a pair of the acquired iris data and identification information of the person.

[Supplementary Note 17]

A storage medium that stores a program for causing a computer to execute processing including:
reception processing of receiving a face image;
determination processing of determining whether a person in the face image is unsuitable for iris data acquisition based on the face image; and
output processing of outputting information based on that it is determined that the person is unsuitable for the iris data acquisition in a case where it is determined that the person is unsuitable for the iris data acquisition.

[Supplementary Note 18]

The storage medium according to supplementary note 17, in which
the output processing outputs at least one of information indicating that the person is unsuitable for the iris data acquisition and information that urges the person to stop a behavior to acquire the iris data of the person, as the information.

[Supplementary Note 19]

The storage medium according to supplementary note 17 or 18, in which
the determination processing detects, from the face image, that the person has a cause that interferes the acquisition of the iris data and determines that the person is unsuitable for the iris data acquisition in a case where it is detected that the person has the cause that interferes the acquisition of the iris data.

[Supplementary Note 20]

The storage medium according to supplementary note 19, in which
the determination processing determines that the person is unsuitable for the iris data acquisition by detecting that the person has the cause regarding opening of eyelids based on shapes of the eyelids of the person.

[Supplementary Note 21]

The storage medium according to any one of supplementary notes 17 to 20, that stores the program for causing the computer to execute processing further including:
iris data acquisition processing of attempting to acquire the iris data from the face image; and
success determination processing of determining whether the iris data acquisition processing has acquired the iris data and whether quality of the iris data acquired by the iris data acquisition processing is sufficient to be used for authentication, in which
the determination processing determines whether the person is unsuitable for the iris data acquisition in a case where it is not possible for the iris data acquisition processing to acquire the iris data or in a case where the success determination processing determines that the quality of the acquired iris data is not sufficient to be used for authentication.

[Supplementary Note 22]

The storage medium according to supplementary note 21, in which
the output processing outputs a message to the person in a case where it is not determined that the person is unsuitable for the iris data acquisition,
in a case where a new face image is input after the output of the message, the iris data acquisition processing attempts to acquire the iris data from the new face image, and the success determination processing makes the determination, and
the determination processing determines that the person is unsuitable for the iris data acquisition in a case where the number of times when the message is output to the person exceeds a threshold in a case where the iris data having quality sufficient to be used for authentication has never been acquired from the person.

[Supplementary Note 23]

The storage medium according to supplementary note 21, in which in a case where the iris data having the quality sufficient to be used for authentication is not acquired, the success determination processing calculates a seriousness of a cause of that the iris data having the quality sufficient to be used for authentication is not acquired based on information used for the determination and records seriousness information indicating the seriousness in a memory, and the determination processing determines whether the person is unsuitable for the iris data acquisition based on a history of the seriousness information.

[Supplementary Note 24]

The storage medium according to any one of supplementary notes 17 to 23 that stores the program for causing the computer to execute processing further including:

imaging processing of generating a face image by imaging; and registration processing, in a case where the iris data of which quality satisfies a predetermined reference for authentication processing using the iris data is acquired, of registering, in a database, a pair of the acquired iris data and identification information of the person.

The application is not limited to the example embodiments described above. It will be understood by those of ordinary skill in the art that various changes in form and details may be made therein without departing from the spirit and scope of the example embodiments as defined by the claims.

This application is based upon and claims the benefit of priority from Japanese patent application No. 2018-181027, filed on Sep. 26, 2018, the disclosure of which is incorporated herein in its entirety by reference.

REFERENCE SIGNS LIST

- 10 information providing device
- 101 reception unit
- 102 determination unit
- 103 output unit
- 11 iris data acquisition device
- 111 control unit
- 112 imaging unit
- 113 iris data acquisition unit
- 114 success determination unit
- 115 suitability determination unit
- 116 generation unit
- 117 output unit
- 118 input interface
- 119 memory
- 21 iris database
- 900 computer
- 901 CPU
- 902 ROM
- 903 RAM
- 904 program
- 905 storage device
- 906 storage medium
- 907 drive device
- 908 communication interface
- 909 communication network
- 910 input/output interface
- 911 bus

The invention claimed is:

1. An information providing device comprising:
   at least one memory storing a set of instructions; and
   at least one processor configured to execute the set of instructions to perform:
   receiving a face image of a person;
   acquiring iris data from the face image;
   determining whether the acquired iris data is sufficient to be used for authentication;
   outputting a message to the person when the acquisition of the iris data sufficient to be used for authentication fails;
   attempting acquisition of new iris data from a new face image when the new face image is received after the message is output and determining whether the new iris data is sufficient to be used for authentication; and
   determining that the person is unsuitable for the iris data acquisition when a difference between first degree of recent failure in the iris data acquisition of the new iris data and second degree of previous failure in the iris data acquisition of the iris data is less than a reference.

2. The information providing device according to claim 1, wherein
   the at least one processor is configured to execute the set of instructions to perform:
   determining that the person is unsuitable for the iris data acquisition when the iris data is not acquired or when quality of the iris data is not sufficient to be used for authentication.

3. The information providing device according to claim 1, wherein
   the at least one processor is configured to execute the set of instructions to perform:
   generating the face image of the person by imaging; and
   registering, in a database, a pair of the acquired iris data and identification information of the person when the acquired iris data is sufficient to be used for authentication.

4. An information providing method comprising:
   receiving a face image of a person;
   acquiring iris data from the face image;
   determining whether the acquired iris data is sufficient to be used for authentication;
   outputting a message to the person when the acquisition of the iris data sufficient to be used for authentication fails;
   attempting acquisition of new iris data from a new face image when the new face image is received after the message is output and determining whether the new iris data is sufficient to be used for authentication; and
   determining that the person is unsuitable for the iris data acquisition when a difference between first degree of recent failure in the iris data acquisition of the new iris data and second degree of previous failure in the iris data acquisition of the iris data is less than a reference.

5. The information providing method according to claim 4, wherein
   the information providing method comprises:
   determining that the person is unsuitable for the iris data acquisition when the iris data is not acquired or when quality of the iris data is not sufficient to be used for authentication.

6. The information providing method according to claim 4, wherein
   the information providing method comprises:
      generating the face image of the person by imaging; and
      registering, in a database, a pair of the acquired iris data and identification information of the person when the acquired iris data is sufficient to be used for authentication.

7. A non-transitory program recording medium that records a program causing a computer to execute processing of:
   receiving a face image of a person;
   acquiring iris data from the face image;
   determining whether the acquired iris data is sufficient to be used for authentication;
   outputting a message to the person when the acquisition of the iris data sufficient to be used for authentication fails;
   attempting acquisition of new iris data from a new face image when the new face image is received after the message is output and determining whether the new iris data is sufficient to be used for authentication; and
   determining that the person is unsuitable for the iris data acquisition when a difference between first degree of recent failure in the iris data acquisition of the new iris data and second degree of previous failure in the iris data acquisition of the iris data is less than a reference.

8. The non-transitory program recording medium according to claim 7, wherein
   the program causes the computer to execute processing of:
      determining that the person is unsuitable for the iris data acquisition when the iris data is not acquired or when quality of the iris data is not sufficient to be used for authentication.

9. The non-transitory program recording medium according to claim 7, wherein
   the program causes the computer to execute processing of:
      generating the face image of the person by imaging; and
      registering, in a database, a pair of the acquired iris data and identification information of the person when the acquired iris data is sufficient to be used for authentication.

* * * * *